April 18, 1950 W. OTTO 2,504,222
TRUCK BODY
Filed May 3, 1948 2 Sheets-Sheet 1
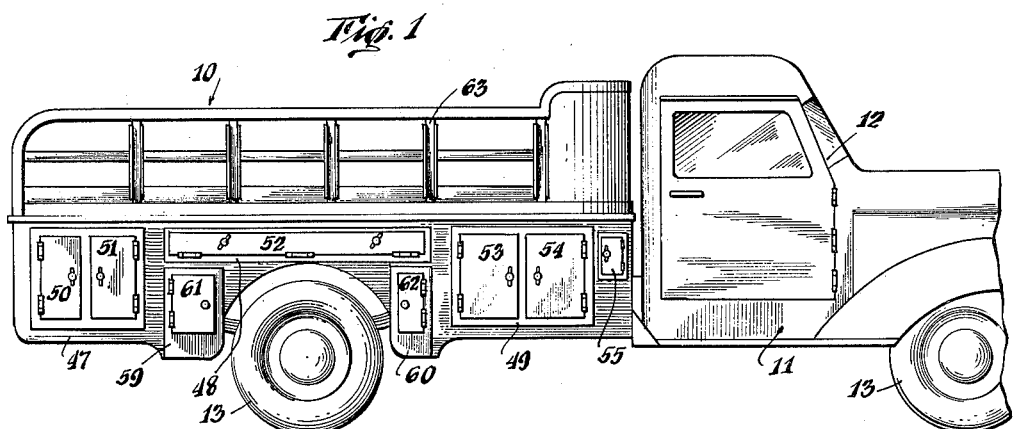
INVENTOR.
Walter Otto
BY Duell & Kane
ATTORNEYS

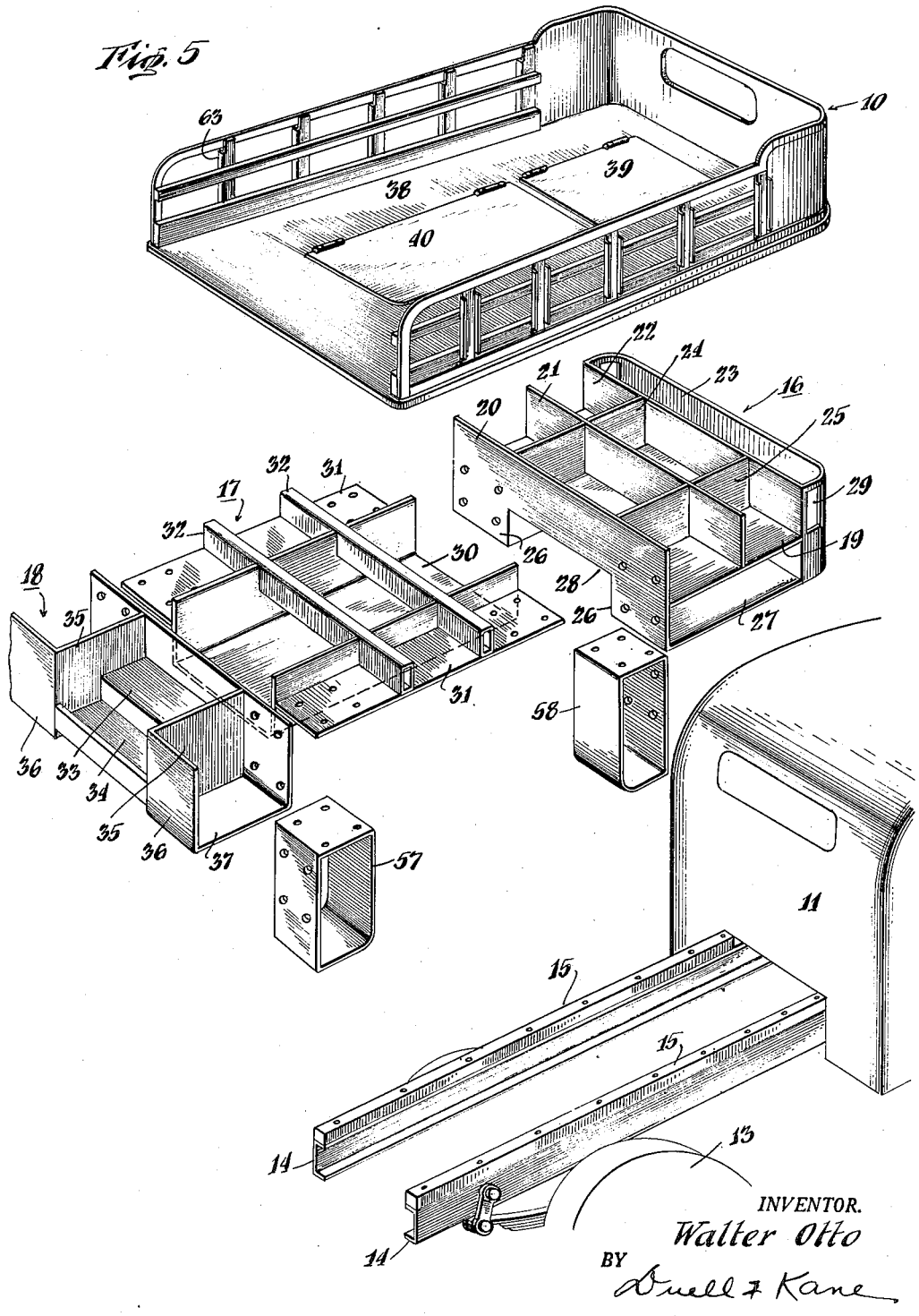

Patented Apr. 18, 1950

2,504,222

UNITED STATES PATENT OFFICE 2,504,222

TRUCK BODY

Walter Otto, Forest Hills, N. Y.

Application May 3, 1948, Serial No. 24,862

2 Claims. (Cl. 296—24)

This invention relates to an improved truck body for vehicles, particularly motor vehicles.

It is an object of the invention to provide an improved truck body which has a flat load-carrying platform of maximum area compatible with the size of the chassis while at the same time providing compartments and storage space for tools and other articles and which is relatively light in weight and compact and efficient in design.

Commercial or truck bodies are generally of two types i. e., (1) the platform or stake rack type and (2) the box or van type. Attempts to combine the two have generally been unsatisfactory.

It is a particular object of the present invention to overcome the prior difficulties and disadvantages and to provide a utility truck body of the above type which will combine in one efficiently arranged unit an adequate load carrying platform and adequate conveniently arranged storage compartments.

My invention contemplates providing a body having a unitary structure with rigidly connected deck and partition members serving to divide the body into storage compartments and also serving to provide a structural member of cellular construction.

In the accompanying drawings:

Fig. 1 is a side elevational view of a truck having a body incorporating my invention;

Fig. 2 is a longitudinal sectional view through the body;

Fig. 3 is a transverse sectional view in the direction of the arrows on the line 3—3 of Fig. 2;

Fig. 4 is a detail view showing one type of watertight closure for the deck compartments; and Fig. 5 is an exploded view showing the several parts which are combined to make the truck body.

My invention is illustrated as incorporated in the truck body 10 mounted on the truck 11. The truck illustrated is one standard type having a cab and engine hood portion 12, wheels 13 and chassis frame members 14 mounted on the wheels in standard fashion by suitable springs and axles. To insulate the chassis frame members from the body portion and to minimize noise I preferably secure suitable non-metallic strips made of wood or plastic material along the upper surface of the chassis frame members as indicated at 15.

My improved body member 10 is arranged to provide maximum platform space for the size of the chassis and adequate and efficiently arranged storage compartments. I have found that this can be accomplished in an efficient, lightweight, compact manner by providing a unitary cellular structure having longitudinally and transversely arranged partition members rigidly interconnected and in turn rigidly connected near their upper ends to a platform or deck. This unit provides adequate structural strength and at the same time, the spaces or cells therein can be used as the storage compartments.

In the specific embodiment illustrated in the drawing the cellular structure is made of three sub-units or parts 16, 17 and 18 which are secured together end to end and are supported on the strips 15 on the chassis. The units are made primarily of sheet metal preferably sheet steel and I have found that plates or sheets approximately ⅛" thick give satisfactory results.

Unit 16 consists of a horizontal base plate 19, transverse plates 20, 21, 22 and 23 and longitudinal plates 24 and 25 all welded together to form a rigid unit. The plates 20 and 22 may be extended downwardly as indicated at 26 adjacent the two sides of the structure beyond the partitions 24 and 25 which are extended downwardly in the same manner. Plates 27 are welded to the lower ends thereof so as to provide another cell or compartment. This structure leaves a central channel portion 28 wide enough to straddle the frame of the chassis so that when the body is assembled with the chassis the base plate 19 rests on the strips 15 with the portions 26 and 27 disposed on the two sides thereof. The transverse member 23 curves rearwardly on the two sides so as to join with the plate 22 and openings 29 are provided in the sides thereof to give access to the space or cell confined therein. It will be seen that the space between the cells or partitions provides storage compartments while the cellular structure per se provides a relatively light-weight structural unit.

The central unit 17 has a channel shaped central portion 30 of sufficient width to rest upon the strips 15 on the chassis frame as shown in Fig. 3 and projecting laterally therefrom on the two sides are the plates 31 welded thereto. The unit 17 straddles the wheel well portion of the body and to give additional strength thereto I preferably provide transverse tubular frame members 32 which extend through the upper portion of the walls of the channel 30 and engage the upper surface of the plates 31. The plates, channel and frame members are welded together as an integral unit. Again it will be seen that the assembly is a rigid structural unit and that the space within the channel 30 and above the plates 31 provide storage compartments.

The unit 18 has a central base plate 33 adapted to rest upon the ends of the strips 15 on the chassis frame and a depending ledge portion 34 and side plates 35 extending downwardly below the top surface of the chassis frame. Side and bottom walls 36 and 37 project outwardly from the plates 35 forming storage compartments. All of the plates in unit 18 are welded together forming a rigid structural unit and the space above the platform 33 and ledge 34 together with the space enclosed between walls 36 and 37 provide storage compartments.

The units 16, 17 and 18 are secured together preferably welded so that the upper surfaces of the longitudinal and transverse partition are at the same level thereby forming a rigid unitary cellular structure. To complete the cellular structure I weld a deck or platform 38 to the top of the partitions of the assembled units 16, 17 and 18. The resulting unit is cellular and therefore light in weight but relatively strong and rigid and the cells or spaces between the partitions may be used as storage compartments.

To afford access to the cells or compartments, I provide suitable doors or closures. Thus, in the deck 38 I provide the hinged, flat doors 39 and 40 which may be opened to provide access to the compartments at the center of units 16 and 17. These doors or closures are preferably arranged so as to be water-tight and a suitable structure for this purpose is shown in Figs. 2, 3, and 4. Thus a strip or bar 41 is welded to the undersurface of the deck or platform 38 around the door openings and a flange 42 rests against the undersurface thereof and projects a short distance into the space beneath the door openings. The flange may be suitably supported as by the bolt and nut assembly 43. On the flange I provide rubber strip 44 having round pins 45 projecting upwardly from the flange at spaced intervals. The pins preferably terminate a short distance from the upper surface of the rubber and are preferably provided with apertures 46 extending therethrough through which a wire may be threaded to retain the rubber in place.

Along the sides of the truck body tapering downwardly from the deck plate I provide the shields or panels 47, 48 and 49 respectively which may be welded in place and which are provided with openings having the hinged doors 50, 51, 52, 53, 54 and 55. The hinged doors 50 and 51 give access to the space confined by the walls 36 and 37 and the plate 35. The door 52 gives access to the space above the horizontal plate 31. The doors 53 and 54 give access to the cells confined between transverse plates 20, 21 and 22 and the horizontal plates 19 and 27. The door 55 gives access to the cell confined between the plates 22 and 23. The arrangement, of course, should be similar on both sides of the truck. The space at the rear of the truck body above the plates 33 and 34 may be closed by a hinged cover 56.

If desired, additional compartment space may be provided on the two sides of the truck by means of the substantially rectangular units 57 and 58, preferably closed on five sides and open on one side as shown. These units are provided with apertures on one side and the top surface by means of which they may be bolted to the plate 31, the plate 26 and the side wall 36. These units not only serve to provide additional storage space but also serve to reinforce and strengthen the structure serving as corner braces in the connection between the units 16 and 17 and the units 17 and 18.

The open sides of the units 57 and 58 may be provided with panels or cowling 59 and 60 having hinged covers 61 and 62 giving access to the cells or space inside the units.

Suitable side walls such as the stake rack 63 may be provided for the body.

I claim:

1. A truck body for vehicles comprising a cellular structure having longitudinal and transverse structural and partition members rigidly connected together, means rigidly secured to and closing the bottom of said cellular structure, a flat deck plate resting on and rigidly secured to the upper portion of said partition members, the assembly providing a rigid unitary structure having cellular compartments provided therein between the structural and partition members, certain of the cellular compartments being positioned along the edges of the structure and others being located at the central portion, closure means provided adjacent the central portion of the deck plate so as to provide access to the cellular compartments at the central portion of the structure and closure means mounted along the edges of said structure and affording access to the cellular compartments around the edges of the structure.

2. A truck body for vehicles as set forth in claim 1 in which certain of the transverse structural and partition members are of tubular construction so as to provide increased rigidity.

WALTER OTTO.

REFERENCES CITED

The following references are of record in the file of this patent:

UNITED STATES PATENTS

| Number | Name | Date |
| --- | --- | --- |
| 1,400,345 | Brile | Dec. 13, 1921 |
| 2,119,742 | Gill | June 7, 1938 |
| 2,119,772 | Buchanan | June 7, 1938 |
| 2,162,367 | Buchanan | June 13, 1939 |
| 2,246,616 | Cherry | June 24, 1941 |